US012045980B2

(12) United States Patent
Dournes et al.

(10) Patent No.: US 12,045,980 B2
(45) Date of Patent: Jul. 23, 2024

(54) METHOD FOR GENERATING A BIOMARKER, SYSTEM

(71) Applicants: UNIVERSITE DE BORDEAUX, Bordeaux (FR); CENTRE HOSPITALIER UNIVERSITAIRE DE BORDEAUX, Talence (FR); INSTITUT NATIONAL DE LA SANTE ET DE LA RECHERCHE MEDICALE—INSERM, Paris (FR)

(72) Inventors: Gael Dournes, Bordeaux (FR); Ilyes Benlala, Bordeaux (FR); François Laurent, Bordeaux (FR); Patrick Berger, Merignac (FR)

(73) Assignees: UNIVERSITE DE BORDEAUX, Bordeaux (FR); CENTRE HOSPITALIER UNIVERSITAIRE DE BORDEAUX, Talence (FR); INSTITUT NATIONAL DE LA SANTE ET DE LA RECHERCHE MEDICALE—INSERM, Paris (FR)

( * ) Notice: Subject to any disclaimer, the term of this patent is extended or adjusted under 35 U.S.C. 154(b) by 391 days.

(21) Appl. No.: 17/631,258

(22) PCT Filed: Jun. 3, 2020

(86) PCT No.: PCT/EP2020/065380
§ 371 (c)(1),
(2) Date: Jan. 28, 2022

(87) PCT Pub. No.: WO2021/018439
PCT Pub. Date: Feb. 4, 2021

(65) Prior Publication Data
US 2022/0301158 A1    Sep. 22, 2022

(30) Foreign Application Priority Data
Jul. 31, 2019  (FR) ...................... 1908734

(51) Int. Cl.
*G06T 7/00* (2017.01)
*G06T 7/11* (2017.01)
*G06T 7/136* (2017.01)

(52) U.S. Cl.
CPC .............. *G06T 7/0012* (2013.01); *G06T 7/11* (2017.01); *G06T 7/136* (2017.01);
(Continued)

(58) Field of Classification Search
CPC ......... G06T 7/0012; G06T 7/11; G06T 7/136; G06T 2207/10088; G06T 2207/20024; G06T 2207/30061
See application file for complete search history.

(56) References Cited

U.S. PATENT DOCUMENTS

2020/0320705 A1* 10/2020 Wiemker .............. A61B 6/5258
2020/0402231 A1* 12/2020 Jhiang ..................... G06T 7/155
2021/0183061 A1*  6/2021 Kanada .................... G06T 1/00

FOREIGN PATENT DOCUMENTS

FR    3 057 094 A1    4/2018
JP    2018-501866 A   1/2018
WO   WO 2015/092622 A2    6/2015

OTHER PUBLICATIONS

International Search Report as issued in International Patent Application No. PCT/EP2020/065380, dated Jul. 6, 2020.
(Continued)

*Primary Examiner* — Christopher M Brandt
(74) *Attorney, Agent, or Firm* — Pillsbury Winthrop Shaw Pittman LLP

(57) ABSTRACT

A Method for generating a biomarker includes acquiring an image using an MRI system; processing the MRI image to generate a three-dimensional image of the lung; generating a first function corresponding to the distribution of the different signal intensity values; automatically calculating a filtering threshold of the first function from a second signal (Continued)

Figure 1:
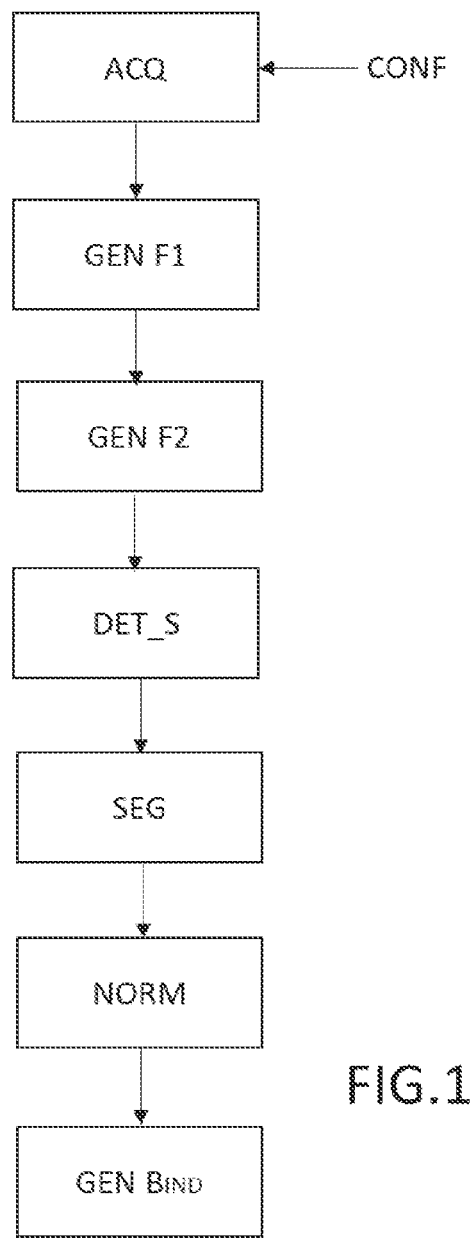

intensity value distribution function; segmenting a lung volume comprising: a main volume; a filtered volume of a volume of voxels quantified by the first function and filtered by at least the calculated filtering threshold, normalizing the values of the three-dimensional image of the lung volume; generating a biomarker indicating a normalized segmented volume ratio.

23 Claims, 9 Drawing Sheets

(52) U.S. Cl.
CPC ............... *G06T 2207/10088* (2013.01); *G06T 2207/20024* (2013.01); *G06T 2207/30061* (2013.01)

(56) References Cited

OTHER PUBLICATIONS

Benlala, I., et al., "Appendix E1—Supplemental Methods," vol. 292, No. 1, Jun. 2019, Radiology, Radiological Society of North America, Inc., Retrieved from the Internet: https://pubs.rsna.org/doi/suppl/ 10.1148/radiol.2019190052, DOI: 10.1148/RADIOL.2019190052, ISSN: 0033-8419, XP009518964, 8 pages.

Benlala, I., et al., "Automated Volumetric Quantification of Emphysema Severity 1.9-18.23 by Using Ultrashort Echo Time MRI: Validation in Participants with Chronic Obstructive Pulmonary Disease," vol. 292, No. 1, Jun. 4, 2019 (Jun. 4, 2019), Radiology, Radiological Society of North America, Inc.,, US, Retrieved from the Internet: https:/ /pubs.rsna.org/doi/suppl/ 10.1148/radiol. 2019190052, DOI: 10.I 148/RADIOL.2019190052, ISSN: 0033-8419, XP009518956, pp. 216-225.

\* cited by examiner

METHOD FOR GENERATING A BIOMARKER, SYSTEM

CROSS-REFERENCE TO RELATED APPLICATIONS

This application is the U.S. National Stage of PCT/EP2020/065380, filed Jun. 3, 2020, which in turn claims priority to French patent application number 1908734 filed Jul. 31, 2019. The content of these applications are incorporated herein by reference in their entireties.

The field of the invention relates to the field of methods for generating biomarkers of the pulmonary region. More specifically, the invention pertains to methods for processing an image in order to quantify the presence of characteristics capable of being associated with a given pathology. The field of the invention applies more specifically to the processing of images acquired by MRI.

At present, the quantification of inflammatory phenomena and re-modelling of the airways is mainly done from a scanner imaging system. This technique, better known by the name of tomodensitometry, TDM, or CT-scan, makes it possible to obtain three-dimensional images offering a resolution and sufficient contrast levels to elaborate quantification strategies. More generally, CT-scan imaging makes it possible to obtain indicators of the 3D extension of anomalies of the pulmonary tracts.

However, this technique has the drawback of being irradiating. Furthermore, this technique does not make it possible to discriminate inflammation from remodeling of the airways. There exists a need to elaborate biomarkers using non-irradiating imaging, and making it possible to characterize the signal of active inflammatory phenomena versus the signal of definitive scar lesions, such as enabled by MRI imaging. Yet, to date, it is difficult to define modalities making it possible to process the images of the pulmonary regions by MRI due to the fact that the tissues and the cellular structures of these regions are varied and difficult to segment without loss of data. Furthermore, the MRI signal is not calibrated as for a scanner, it is thus not possible to use raw data of the signal values on a given image, whereas the parametric mapping of real values of T1 and T2, on a lung, are of nature to "contain artefacts", that is to say having acquisition errors, by the magnetic susceptibility of the normal lung. There does not exist to date an acquisition modality which makes it possible to define a suitable segmentation of the airways offering possibilities of generating biomarkers sufficiently efficient to substitute for a CT-scan acquisition.

There thus exists a need to define a solution that can respond to this problem. The present invention aims to resolve the aforesaid drawbacks.

According to a first aspect, the invention relates to a method for generating a biomarker comprising:
  acquiring an image using an MRI system;
  processing said MRI image to generate a three-dimensional image of the lung;
  generating a first function corresponding to the distribution of the different signal intensity values of each voxel of a portion of the acquired three-dimensional image;
  automatically calculating at least one filtering threshold of said first function from at least one second distribution function of the different signal intensity values of each voxel of a portion of the acquired three-dimensional image;
  segmenting a volume comprising:
    A main volume, corresponding to the lung volume;
    A filtered volume of a volume of voxels quantified by the first function and filtered by means of at least the calculated filtering threshold,
  normalizing the values of the three-dimensional image of the lung volume from the absolute values of the signal intensity values of the voxels of the image and at least the calculated filtering threshold; generating a biomarker indicating a normalized segmented volume ratio.

The lung volume corresponds to the volume delimited by the walls of the lung(s).

Advantageously, the invention enables automatization of the generation of a biomarker while defining adaptive thresholds according to the patient. Another advantage is to make it possible to configure an acquisition to generate different biomarkers according to the case of use that it is wished to obtain.

The step of generating a first function corresponding to the distribution of the different signal intensity values of each voxel of a portion of the acquired three-dimensional image corresponds, in other words, to the application of a first function leading to the generation of a distribution of the different signal intensity values of each voxel of a portion of the acquired three-dimensional image.

According to an example, the method is implemented by a function within a console for exploiting the acquired MRI images or within an equipment comprising a physical or wireless interface with the console for exploiting the MRI system. In order to implement the method of the invention, an interface for receiving MRI images and a memory for storing them may be used.

The equipment making it possible to implement the method of the invention advantageously comprises a display and a graphic interface in order to configure a parameterization according to the biomarker that it is wished to generate.

According to an embodiment, the method comprises
  the acquisition of a three-dimensional image using an MRI system configured by:
    a $T_2$ weighting;
    an echo time TE greater than a predefined threshold;
  the automatic calculation of at least one threshold comprising:
    acquiring a reference volume;
    generating a reference function corresponding to a distribution of the different signal intensity values of each voxel of the reference volume, said reference function being the second distribution function;
    calculating the standard deviation of the reference function;
    determining a reference threshold from the calculated standard deviation of the reference function.

An advantage is to enable a biomarker to be generated making it possible to quantify a volume of mucus load and/or oedema without implementing an irradiating technique.

According to an example of this embodiment, the acquisition is parameterized and comprises:
  An acquisition of an image composed of a plurality of images acquired over a number of cycle(s) of at least 4 echo times, the echo times being configured according to increasing durations;
  A spin echo sequence;
  A parameterization aiming to emit a signal to pre-saturate or saturate the acquired signal.

An advantage is notably to improve the processing of circulating volumes in order to eliminate them from the image processing.

According to an example of this same embodiment, a second acquisition of the image is made with a first configuration for outlining the lung volume, a step of image processing being carried out to combine the image acquired with $T_2$ weighting with the image acquired by the second acquisition. The first configuration defines a parameterization of a $T_1$ weighted or proton density weighted acquisition. Put another way, the first acquisition makes it possible to configure a $T_1$ type weighting or a proton density type weighting.

An advantage is to construct a mask making it possible to outline the lung volume and organs such as the heart in order to process the image acquired with $T_2$ weighting. Indeed, generally the image acquired with $T_2$ weighting does not make it possible to obtain segmentation of the lung volume which alone makes it possible to outline the contours of organs.

According to an example of this embodiment, a merging operation between at least one image acquired with $T_1$ weighting with an ultra-short echo time UTE and at least one image acquired with $T_2$ weighting is realized to generate an image of which the data coming from the acquired images have been combined to segment the lung volume.

An advantage is to generate an image from the merging of two images, the image produced offering an optimal isolation capacity of the zones of interest within a lung volume.

According to an example of this embodiment, the reference threshold is determined from a combination between a reference distribution value of the reference function FA and a value comprised between 10 and 20 times the value of the standard deviation $6_A$ of the reference function $F_A$.

An advantage is to make it possible to eliminate a noise level.

Another advantage is to define an adaptive threshold in order to generate a threshold compatible with a large number of patients.

According to an example of this embodiment, the reference distribution value of the reference function FA is the main mode M of the distribution of the signal intensity values of the image acquired with $T_2$ weighting within the lung volume $V_P$. An advantage is to use a reference value to realize a filter that can be applied to different types of patients having different profiles. Thus, the filter is adaptative and makes it possible to be free of the acquisition configuration or the profiles of patients. The selection of the main mode makes it possible to define an adaptive threshold for each patient.

According to an example of this embodiment, the method comprises a step of normalization, the normalization comprising the calculation of a volume intensity product (VIP) of the signal from the absolute values of the signal of the filtered volume $V_F$, the volume resulting from the filtered volume $V_F$ and the lung volume $V_P$. An advantage is to quantify the levels of inflammation, for example, of a zone of the lung. Another advantage is that it is possible of quantify the propagation of an inflammation over time.

According to another embodiment, the method for generating a biomarker is characterized in that:
the acquisition of a three-dimensional image using an MRI system, is configured by:
a proton density or $T_1$ weighting of the echo time;
an echo time less than a predefined threshold; the automatic calculation of at least one threshold comprises:
modeling at least two gaussian functions by adjustment of the first function;
determining the first filtering threshold by a calculation of the intersection of the first gaussian function and the second gaussian function;
determining a second threshold corresponding to a minimum value of the first gaussian function and a minimum value of a signal intensity value of a voxel;
the filtered volume is a first volume corresponding to the voxels quantified by the first gaussian function comprised between the first threshold and the second threshold, said voxels corresponding to an air medium,
normalizing the values of the three-dimensional image of the lung volume from the calculated first threshold and the second threshold,
generating a first biomarker indicating a ratio of a volume characteristic of the normalized segmented volume, said ratio being calculated between the characteristic volume and the lung volume.

An advantage of this configuration is to obtain good segmentation of the lung while isolating characteristic volumes thanks to a biomarker which may be representative of a phenomenon linked to emphysema.

According to an example of this embodiment, the echo time is less than 1 ms. An advantage of an acquisition configuration with a relatively short TE is to be insensitive to Foucault currents. This configuration makes it possible to maximize the signal in the pulmonary parenchyma.

According to an example of this embodiment, the segmentation comprises the definition of a second volume corresponding to the voxels quantified by the second gaussian function greater than the first threshold, said voxels corresponding to a fatty or intermediate medium. An advantage is to improve the segmentation of the different volumes in the lung.

According to an example of this embodiment, the segmentation comprises a step of extracting a characteristic volume comprising voxels of the filtered volume of which the signal intensity value is less than a third predefined threshold, said predefined threshold being determined over a normalized scale of [0; 1]. An advantage is to obtain a biomarker representative of the emphysema phenomenon.

According to an example of this embodiment, the segmentation comprises a step of exclusion/deletion of voxels disconnected from their neighborhood of voxels of a same quantification. An advantage is to reduce acquisition artefacts and to select the volumes really corresponding to a characteristic volume of a pathology.

According to an example of this embodiment, the modeling of the gaussian functions comprises:
A gaussian smoothing applied to the acquired image with reduction of the one-off encoding time and with radial acquisition for denoising;
Outlining the contours by application of a local filter;
Using the curve adjustment method representing the voxel distribution frequency.

An advantage is to obtain realistic and faithful modeling of a distribution of the intensity of the values of the signal in the image. The functionalization of the processing from the gaussian functions makes it possible to generate a processing identical for each patient which is representative and at the same time adaptative.

According to an embodiment, the method comprises the acquisition of the signal intensity values of each voxel quantified by the first function, the intensity values corresponding to an image contrast datum.

According to an embodiment, the acquisition is made in a synchronized manner with a respirator. According to an example, the respirator is a navigator or a respiratory belt. An advantage is to be free of movements of the lung during acquisition of the image.

According to an embodiment, a step of extracting a volumetric image is carried out from the images acquired by MRI, said extracted image being realized at a determined instant of the sequence.

According to another embodiment, the acquisition of the three-dimensional image is made by means of a stack of acquired 2D images, the thickness of the section being equal at least to the width of a voxel;

According to another aspect, the invention relates to a system comprising at least a calculator and a memory and an interface for receiving an image acquired by an MRI system, said system being configured to implement the steps of the method of the invention. Advantageously, a display makes it possible to visualize the acquired MRI images and the processed images. The biomarkers can be represented graphically within a generated image. According to an example, a graphic interface makes it possible to adjust the acquisition parameters and to define the zones of interest or a searched for pathology.

According to an embodiment, a first acquisition and a second acquisition according to the method of the invention are carried out successively within a respiratory cycle, each acquisition being synchronized with a datum characteristic of an inspiration and respectively an expiration, the method comprising, further:
- generating the first biomarker for each acquisition of a same respiratory cycle;
- extracting a quantification of a main volume for each acquisition of a same respiratory cycle and,
- elastic resetting between these two respiratory times in order to select voxels representative of a corrected difference between the two biomarkers generated at each of the acquisitions.

According to an embodiment, the method comprises a normalized quantification of said selected voxels between the two acquisitions.

According to an embodiment, the acquisition is a 4D acquisition configured to acquire over a predefined duration a variation in the first biomarker per time unit.

According to an embodiment, the 4D acquisition is configured to acquire a volume of voxels over a time unit corresponding to a duration of a respiratory cycle, said acquisition being synchronized with a datum characteristic of an inspiration and/or an expiration.

Figure 2:
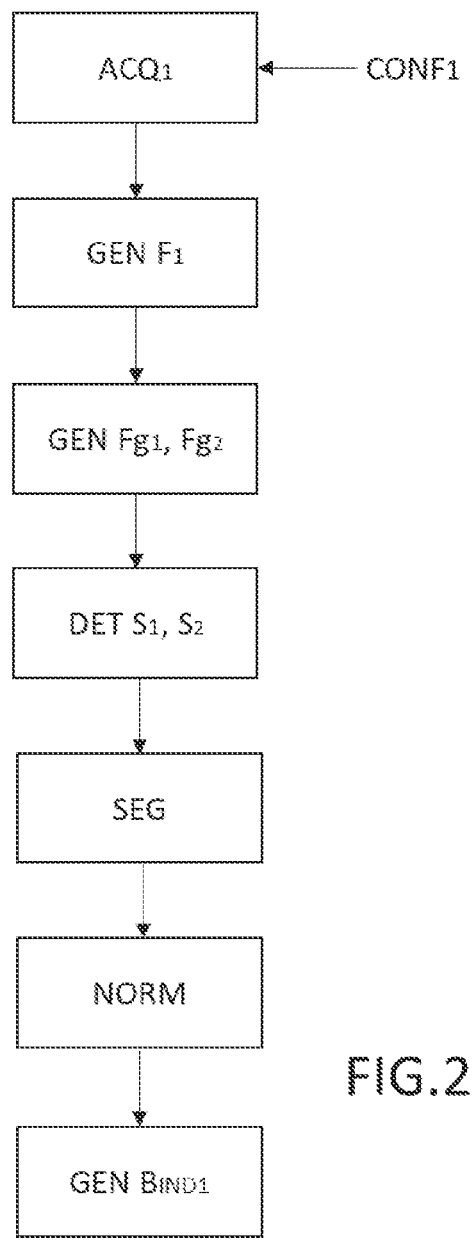
Figure 3:
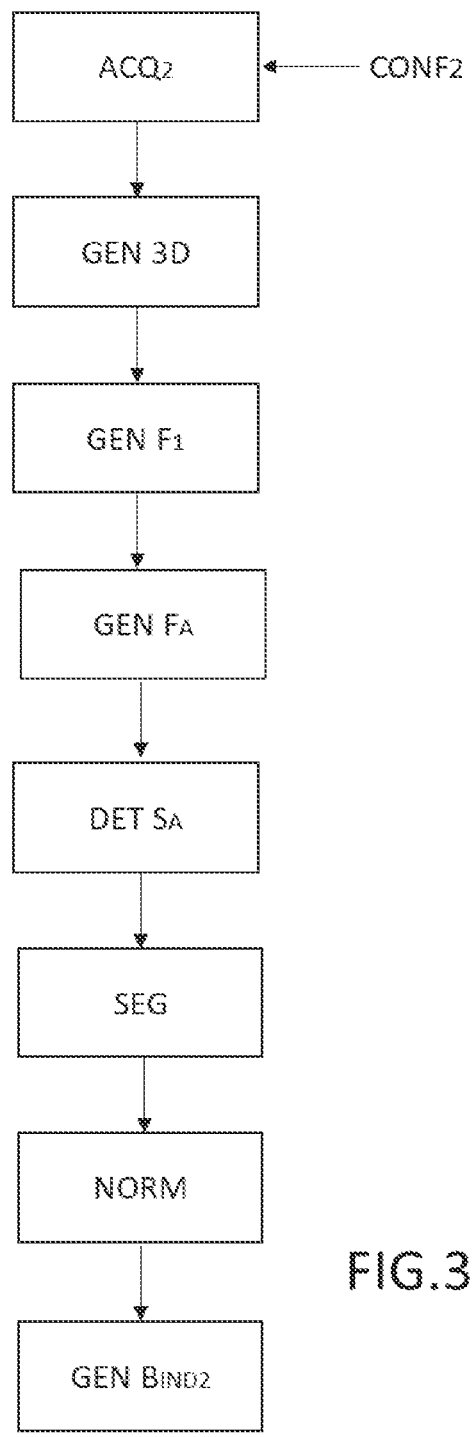
Figure 4:
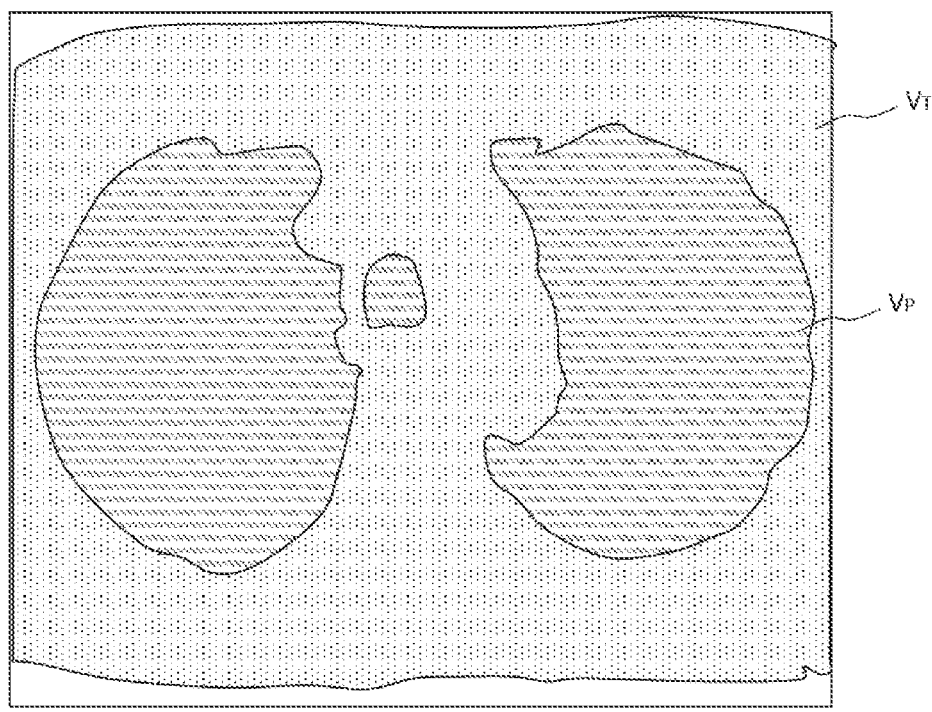
Figure 5:
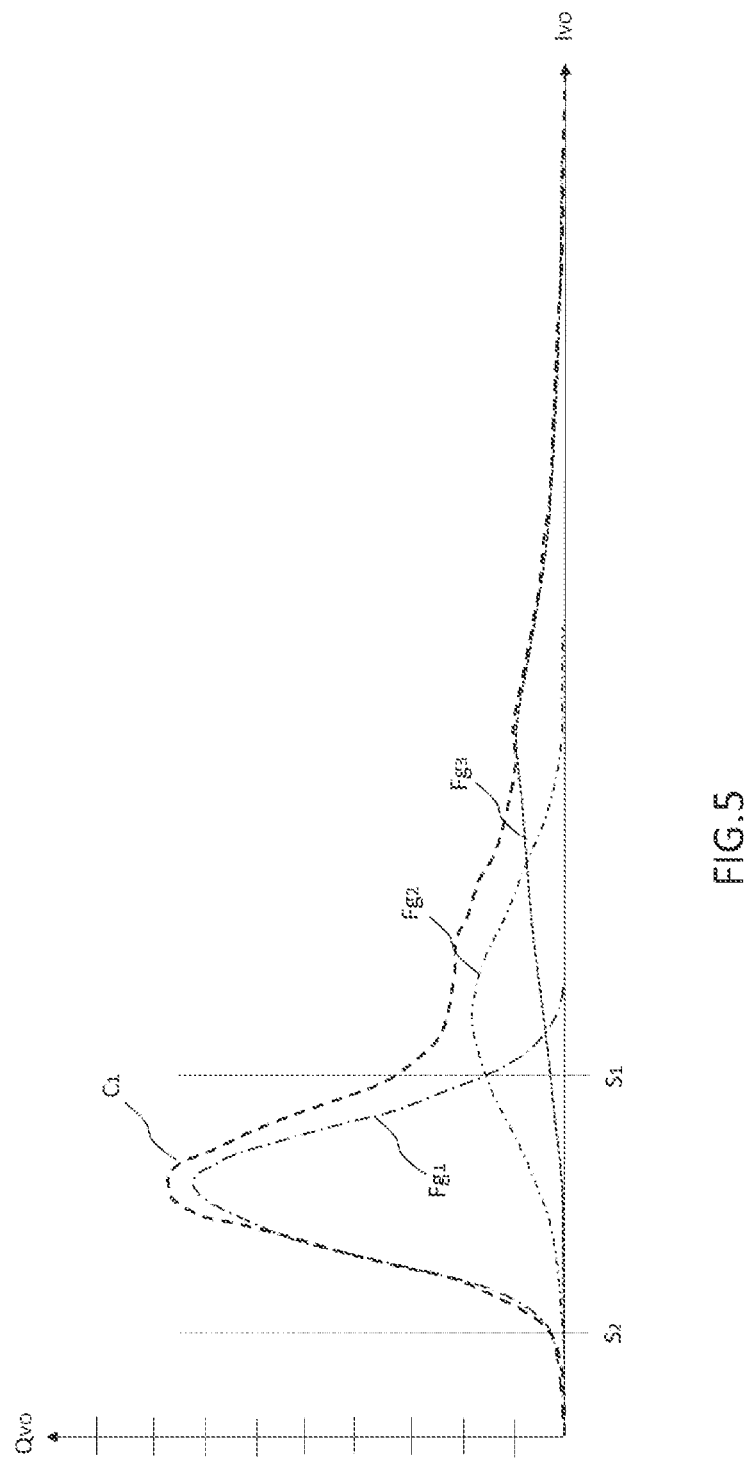
Figure 6A:
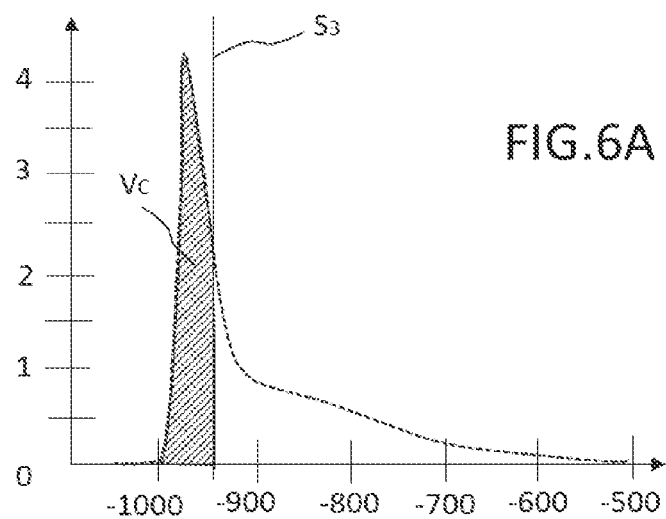
Figure 6B:
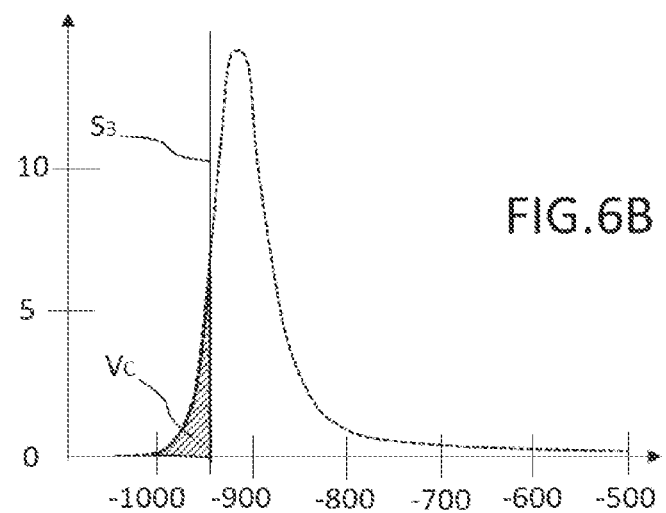
Figure 7A:
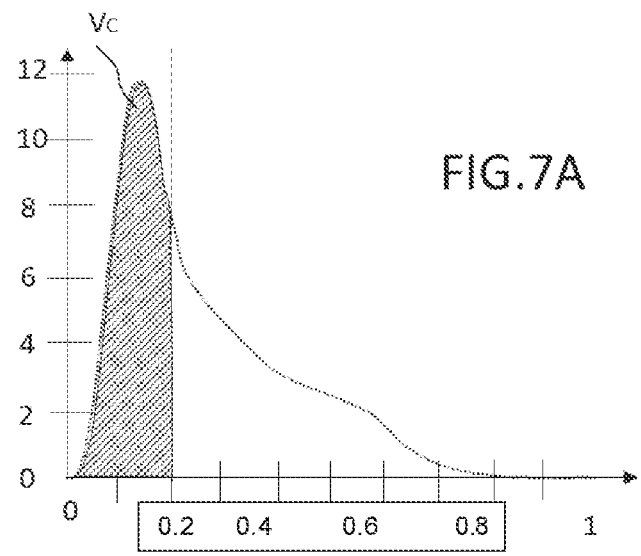
Figure 7B:
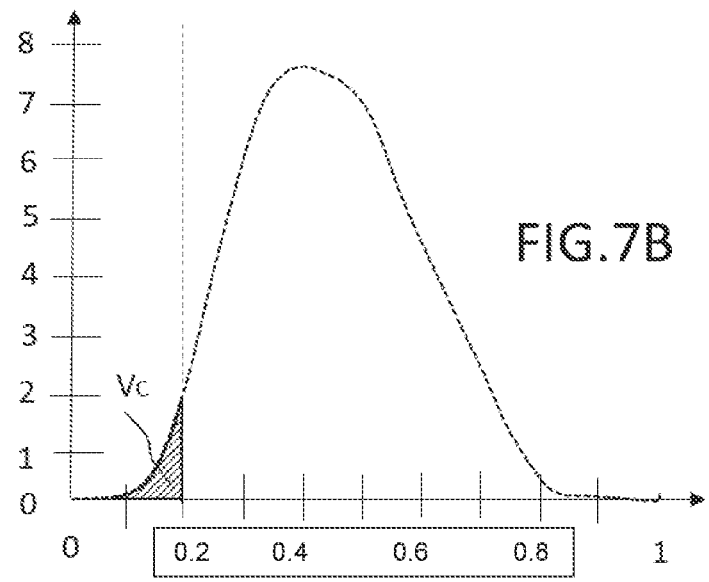
Figure 8:
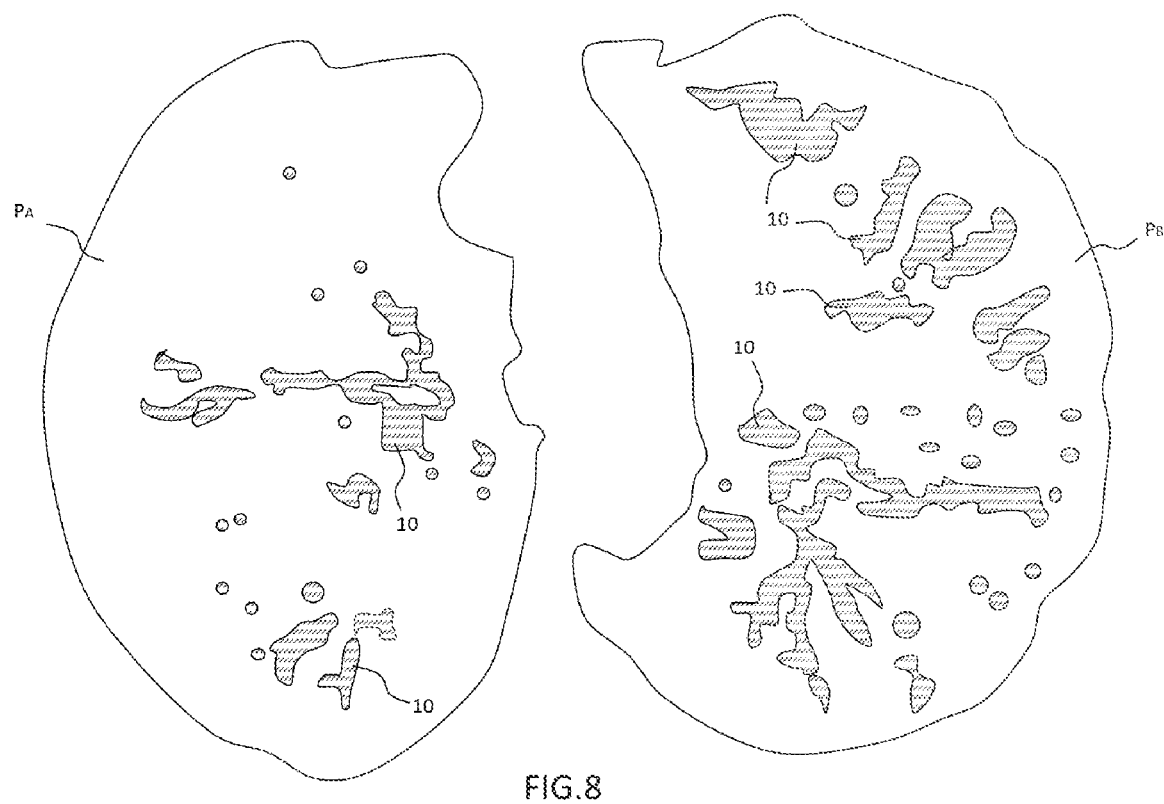
Figure 9:
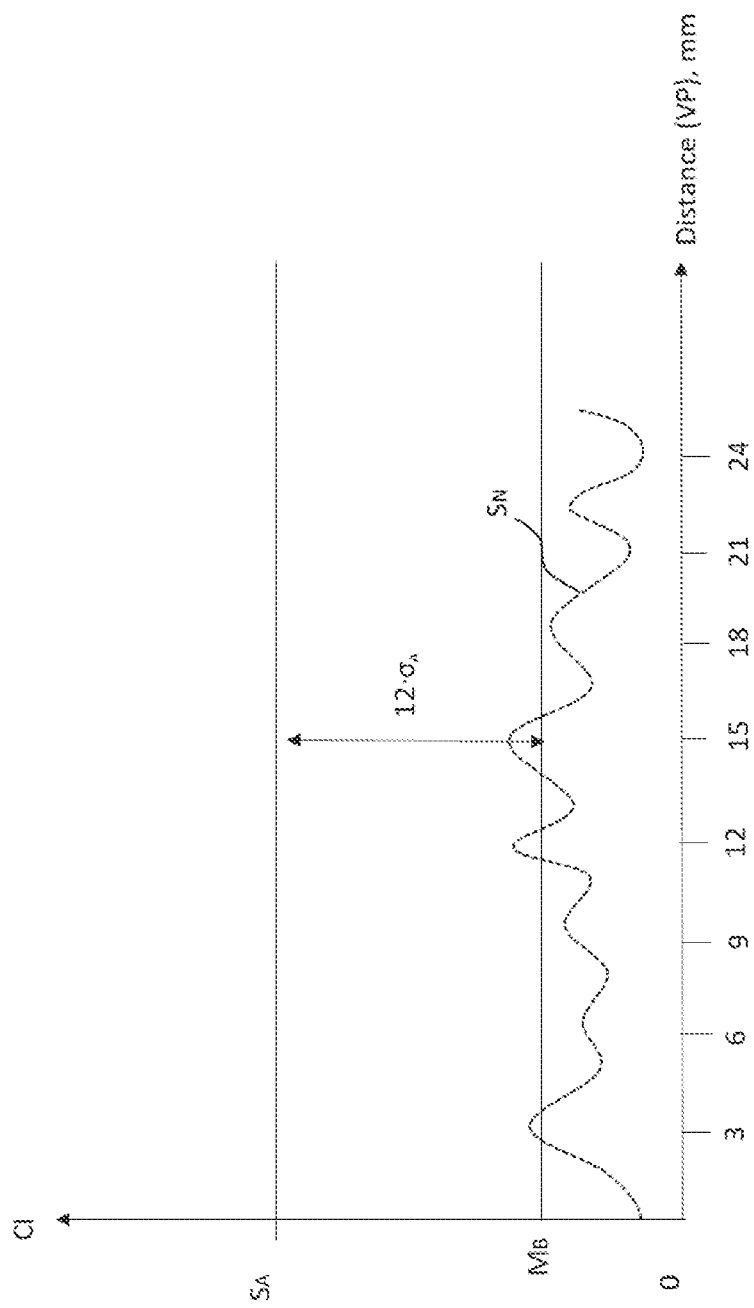

Other characteristics and advantages of the invention will become clear from reading the detailed description that follows, with reference to the appended figures, which illustrate:

FIG. 1: steps of an embodiment of a method of the invention;

FIG. 2: a first embodiment of the method of the invention applied to quantify a lung air volume in order to generate a first biomarker;

FIG. 3: a second embodiment of the method of the invention applied to quantify a displaced volume of the airways in order to generate a second biomarker;

FIG. 4: a 2D section of a three-dimensional image of the lung, the section or the three-dimensional image being acquired by means of an MRI system;

FIG. 5: an exemplary use of two functions for determining a first threshold in order to generate a first biomarker normalized according to the first embodiment;

FIG. 6A: an example of a curve quantifying the different 2D image contrasts obtained using a scanner and a threshold making it possible to generate an indicator representing a quantification of the emphysema of a patient with chronic obstructive pulmonary disease;

FIG. 6B: an example of a curve quantifying the different contrasts of the 2D image obtained using a scanner and a threshold making it possible to generate an indicator representing a quantification of the emphysema of a healthy patient;

FIG. 7A: an example of a curve quantifying the different contrasts of the 2D image obtained by an MRI and processed according to the method of the invention for automatically calculating a threshold making it possible to generate an indicator representing a quantification of the emphysema of a patient with chronic obstructive pulmonary disease;

FIG. 7B: an example of a curve quantifying the different contrasts of the 2D image obtained using an MRI and processed according to the method of the invention for automatically calculating a threshold making it possible to generate an indicator representing a quantification of the emphysema of a healthy patient;

FIG. 8: a representation of a quantity of a congested volume (e.g. secretion of mucus) of a lung volume in a patient in a sectional plane of an MRI, FIG. 9: a representation of a reference threshold making it possible to filter voxels of high intensities in order to generate a mask.

DEFINITIONS

In the remainder of the description, a three-dimensional image comprises a plurality of volume pixels, also called voxels. The terms image pixel or voxel will be used indiscriminately.

In the remainder of the description, a "hyposignal" will designate a signal of low intensity, appearing on the MRI image as a black or dark grey patch. This is the case in the absence of protons (air), short $T_2$ substances (calcified tissues (cortical bone, enamel, calcifications), tissues rich in collagen (tendons, ligaments, fasciae, etc.), protein rich fluids, stagnant fluids (urine, LCS, effusions, oedema, inflammation, etc.), paramagnetic effect substances (concentrated gadolinium), iron at high concentration (haemochromatosis), certain hematoma, etc.

In the remainder of the description, "hypersignal" will designate a high intensity signal, appearing on the MRI image as a white or light grey patch. In $T_1$ it is the signal of the substances at short $T_1$: lipids (fat, fatty tumors, fatty bone marrow, etc.), protein rich fluids (mucoceles, tumoral cysts, etc.), paramagnetic effect substances (gadolinium, etc.), iron (subacute hem atom a), free radicals (melanin), posterior pituitary gland, etc. In $T_2$, it is the case of free water (urine, LCS, effusions, synovial fluid, etc.), interstitial water (oedema, inflammation, etc.), stagnant blood, low protein liquids, etc.

FIG. 1 represents the main steps of an exemplary embodiment of the method of the invention. The steps comprise an acquisition of an image or a sequence of images using an MRI system. The acquisition is, for example, made by acquisition of 2D sections which are next stacked to form a three-dimensional image. According to another example, the acquisition is a direct three-dimensional acquisition which makes it possible to obtain a 3D image. The invention is also compatible with a so-called "4D" acquisition in which the temporal scale is taken into account for generating and reconstructing an image using an image processing algorithm.

According to an embodiment, a device for measuring the respiration rate is used to acquire the signal with respiratory synchronization. A respirator may be used or any other device making it possible to synchronize the respiratory rate with the image acquisition. This characteristic makes it possible to obtain acquisitions less sensitive to movements.

The method of the invention comprises a step aiming to generate a first distribution function $F_1$ of a distribution of voxels of the image as a function of the signal intensity. The resolution of the parameter is configured according to the mode of acquisition of the MRI image. According to other embodiments, the signal intensity taken into account is represented from a tone, saturation or luminosity level or a combination of these three factors. According to an example, the signal intensity is a parameter encoded according to an absolute scale according to the acquired image. According to another example, the parameter is encoded according to a relative scale as a function of the amplitude of variation of the parameter on all of the voxels of the acquired image.

The first function $F_1$ thus makes it possible to take into account the distribution of this signal intensity in the image.

The method of the invention comprises a step of generating a second function $F_2$ making it possible to calculate automatically a threshold applied to the function $F_1$ in order to normalize the distribution values obtained.

The second function $F_2$ is advantageously a function describing a distribution of the signal intensity of the image. According to different embodiments, this function may be implemented and defined in such a way as to optimize the calculation of the threshold, to generate a threshold enabling an optimized normalization or as a function of an objective of identification of a pattern in the image or a singularity linked to the distribution of the function $F_1$.

The method of the invention comprises a step, DET_S, making it possible to determine at least one threshold automatically. The at least one threshold determined is notably used to filter the distribution of the signal intensity represented by the first function $F_1$ or by the second function $F_2$.

According to different embodiments, a plurality of thresholds may be determined. The thresholds may be determined using an operation or a combination of operations on at least the second function $F_2$. The operations may comprise curve intersection calculations, standard deviation calculations or the determination of a characteristic value, or instead any other type of calculation being able to be performed on a digital function.

The method comprises a step SEG aiming to segment a volume of the acquired image, by selecting the pixels relative to the function $F_1$, filtered with at least one previously determined threshold.

The segmentation comprises the segmentation of the lung volume $V_P$ and at least one filtered volume $V_F$. The filtered volume $V_F$ may correspond to a volume obtained after filtering of the function $F_1$ or $F_2$. This segmentation may be carried out in several steps. A first step may correspond to the segmentation of the lung volume $V_P$, that is to say to the lining of the lung.

According to an embodiment, the method of the invention comprises a step of normalization which notably makes it possible to normalize the proportion of a filtered volume $V_F$ segmented over the lung volume $V_P$.

According to an embodiment, the method of the invention comprises a step aiming to extract a characteristic volume of the filtered volume which is representative of a physiological sign. It may be a biomarker making it possible to quantify or qualify the presence of a pathology.

The method thus makes it possible to generate a biomarker $B_{IND}$ making it possible to evaluate the proportion of a characteristic volume $V_C$.

According to a first embodiment of the invention, an implementation of the method makes it possible to generate a first biomarker $B_{IND1}$. According to another embodiment, i.e. a second embodiment, the method of the invention makes it possible to generate a second biomarker $B_{IND2}$.

First Biomarker

FIG. 2 represents the main steps of the first embodiment of the invention. In this embodiment, a first configuration $CONF_1$ of the MRI imaging system is realized. The first configuration $CONF_1$ makes it possible to configure a $T_1$ or proton density type weighting. In both weighting cases, the echo time, noted TE, is defined less than a predefined threshold. The repetition time, noted TR, is itself configured according to a range of values considered as short or long according to the weighting used, Those skilled in the art will know how to establish the association between the TE, TR configuration and the weighting chosen.

Acquisition

This MRI acquisition may be a volume acquisition, that is to say that the image obtained is directly a three-dimensional image. This configuration $CONF_1$ makes it possible to define an ultrashort echo time, designated "UTE", or instead a Zero TE sequence, also called ZTE. The UTE sequence may be used to acquire an isotropic 3D image.

The 3D images may be obtained, for example, by means of a cylindrical acquisition with stacked radial planes or a spherical acquisition using radial projections in three directions. A possible choice is to take the ends of the rays on the surface of the sphere distributed on spirals. Such acquisition modes are described for example in the publication "IRM pulmonaire 3D á temps d'écho ultracourt par acquisition spiralee ou sphé rique de l'respace-k" (Pulmonary 3D MRI with ultrashort echo time by spiral or spherical acquisition of the k-space), Joseph Yazbek. The filling of the volume is done by the reading gradient. This ends up in a discretized surface in a substantially uniform manner in spherical coordinates.

The ZTE sequence is also a 3D acquisition technique. This technique comprises the application of a stable amplitude gradient and the sending of an RF pulse having a very short duration and a small flip angle. The acquisition begins after a given duration which corresponds to the flip between emission and reception. Between two TRs, the amplitude of the reading gradient increases gradually. This configuration has the advantage of being insensitive to Foucault currents due to the fact that there is no constraint on the speed of variation in the intensity of the gradient during the acquisition time.

An interest of a UTE or ZTE sequence is to maximize the available signal in the pulmonary parenchyma.

The image acquired may be processed by image processing algorithms in order to reduce noise, eliminate artefacts or to adapt a contrast scale.

According to an embodiment, when the acquisition is made in 2D and not in 3D, a step of reconstruction of a 3D image may be carried out per stack of 2D layers. The three-dimensional image obtained, and optionally processed, then comprises a plurality of voxels.

Image Processing

FIG. 4 represents a section of a three-dimensional image of each lung having a lung volume $V_P$. The volume of the thoracic cage is for example here represented by the volume $V_T$. In this image is illustrated the contour of the lining of each lung notably thanks to a discontinuity of the signal intensity of the voxels delimiting the volume of each lung with the volume of the thoracic cage.

According to an embodiment, the MRI imaging system is configured with a PETRA sequence. According to an exemplary embodiment, a contour booster filter may be applied to the acquired image. An interest is to obtain a better definition of the contrasts of the image. The outlining of the contours may be obtained from the application of a local filter.

According to an embodiment, the method of the invention comprises a step of gaussian smoothing applied to the acquired image with reduction of the one-off encoding time and with radial acquisition for denoising. An interest of this processing is to reduce the noise obtained during the acquisition by this processing method of the assumed regularity of the curve obtained.

Extraction of the Lung Volume

The method of the invention makes it possible to generate a curve $C_1$ representing the spread or the distribution of the voxels according to the signal intensity value or a colorimetric parameter. This distribution may be limited to the lung volume $V_P$ by carrying out beforehand the extraction of the 3D lining of the lung. This extraction may be performed automatically using an algorithm for processing contours based on the analysis of the signal intensity value or a colorimetric parameter of the voxels and their neighborhood.

The signal intensity value or colorimetric parameter making it possible to realize a distribution of the voxels is advantageously a contrast datum. Any other type of parameter could be used as a function of the acquired image. For example, a luminosity, tone or saturation datum may be used in combination or in an alternative contrast datum.

Thus, a first function $F_1$ represents the voxel distribution curve in the lung volume $V_P$ according to a given resolution. The given resolution corresponds to the resolution of the acquisition of the image. The resolution is thus dependent on the image acquisition configuration.

The function $F_1$ may be a continuous function or a discrete function. In this latter case, the voxels may be gathered together according to a scale defining a contrast unit. This scale may be predefined or automatically calculated as a function, for example, of a minimum value and a maximum value and the lung volume and/or as a function of the number of voxels considered. The curve $C_1$, which is the graphic representation of the function $F_1$, is illustrated in FIG. 5.

According to an embodiment, the extraction of the volumes within the lung volume $V_P$, such as the filtered volume $V_F$ or the characteristic volume $V_C$, comprises an image processing making it possible to exclude, or even eliminate, voxels of a same range of contrast which are disconnected from voxels in their neighborhood. An interest is to eliminate false positives, acquisition errors or voxels outside of zones of interest representative of a physiological or pathological sign.

The method of the invention comprises a step of automatically calculating at least one threshold $S_1$ making it possible to filter the voxels of the distribution represented by the function $F_1$ or of a function modeling the function $F_1$.

In this first embodiment, two thresholds $S_1$ and $S_2$ are calculated. The threshold $S_1$ defines a maximum value and the second threshold defines a minimum value of the signal intensity value or colorimetric parameter considered for generating the distribution of the voxels.

Definition of the Second Function

According to this first embodiment, in order to determine optimal thresholds, the method comprises a step aiming to model at least two gaussian functions $Fg_1$, $Fg_2$ by adjustment of the first function $F_1$.

These two gaussian functions $Fg_1$, $Fg_2$ are obtained such that they each model a distribution of the signal of the lung volume $V_P$, that is to say the distribution of the voxels within the lung volume $V_P$.

The first gaussian function $Fg_1$ essentially models the signals of the lung volume $V_P$ corresponding to an air medium. The second gaussian function $Fg_2$ essentially models the signals of the lung volume $V_P$ corresponding to an intermediate medium, such as the heart, muscles, vessels or bone marrow.

The modeling by adjustment of the curve $C_1$ makes it possible to obtain two functions $Fg_1$ and $Fg_2$ representing two Gaussian distributions. FIG. 5 represents the curves associated with the functions $Fg_1$, $Fg_2$. A third curve $Fg_3$ also represented in FIG. 5 may be obtained by adjustment of the curve $C_1$. The function $Fg_3$ essentially models the signals of the king volume $V_P$ corresponding to a fatty medium.

Generation of Thresholds

The first threshold $S_1$ is generated automatically by a calculation of the intersection of the curves $Fg_1$ and $Fg_2$. The first threshold $S_1$ defines a maximum value of a quantification of the signal in the lung volume $V_P$. In the case of FIG. 5, it is a maximum value of a contrast parameter. The maximum value $S_1$ makes it possible to filter the voxels of the distribution of $C_1$ below the value of the first threshold $S_1$.

An interest of the definition of the first threshold $S_1$ is to obtain the best segmentation between the values of the pulmonary parenchyma tissue and soft parts.

The second threshold $S_2$ is generated automatically by considering a minimum contrast value defining the first voxels having a first level of contrast. FIG. 5 represents the second threshold $S_2$.

An interest is to be free of the variability of the absolute values of the signal of the image which may be dependent from one patient to the other or from one given configuration to another. The method of the invention makes it possible to consider the minimum value of the signal of the image as a value normalized to 0.

A step of segmentation SEG of the lung volume is then carried out with the objective of extracting the filtered volume $V_F$ defining the voxels of the curve $C_1$ of which the signal intensity value or of which the colorimetric parameter is comprised between the second threshold $S_2$ (minimum value) and the first threshold $S_1$ (maximum value). The volume of the lung $V_P$ forming the lining of each lung is also extracted at this step, if it has not been done previously.

Normalization

The method comprises a step of normalization NORM making it possible to normalize the values of the signals comprised between the two thresholds $S_2$ and $S_1$. The minimum value corresponding to the threshold $S_2$ is defined at the value 0 and the maximum value corresponding to the threshold $S_1$ is defined at the value 1. The values at 0 are close to the values of the voxels corresponding to an intra-pulmonary air medium. The values at 1 are close to the values of voxels corresponding to soft thoracic parts.

The method of the invention thus makes it possible to select a first adaptive threshold $S_1$ which makes it possible to quantify the volume of signals of which the value is less than this first threshold $S_1$.

Advantageously, the method makes it possible to take into account a possible variation in the threshold level according to the patient.

4D Acquisition for Monitoring the Biomarker

The method of the invention may be applied either from a static three-dimensional MRI image or from a dynamic three-dimensional MRI image with an additional temporal component. This is then referred to as 4D acquisition. An interest of 4D acquisition is to generate a dynamic marker which makes it possible to evaluate the temporal variation of the first biomarker $BIO_{IND1}$ for a given duration. This acquisition is particularly interesting when the variation of the indicator is measured between the inspiration and the expiration of a patient. The first biomarker $BIO_{IND1}$ then makes it possible to quantify a functional impairment of the small airways, Indeed, an overall measurement of the variation in pulmonary signal over the course of time does not make it possible to discriminate systematically fixed destruction lesions, designated emphysema, from a potentially reversible impairment of the small airways, or alveolar trapping. An interest of the invention is thus to define a dynamic biomarker making it possible to obtain a quantification of the voxels that can make it possible to discriminate emphysema from a reversible impairment of the small airways.

The 4D acquisition method of the invention is particularly suitable and efficient for the processing of pulmonary hyposignals.

The 4D acquisition of the lung may be achieved according to two embodiments.

In a first embodiment, two static acquisitions are carried out. A first acquisition is made during inspiration, the second acquisition is made during expiration or when the patient is holding his breath. Each acquisition may be triggered jointly with a synchronization of the targeted prospective respiration.

The synchronization may be carried out for example from a device aiming to measure the air expired or inspired by a patient.

In a second mode, an acquisition in free respiration is made and a retrospective respiratory synchronization makes it possible to break down the whole of the respiratory cycle.

According to the first embodiment, the extraction of the signals targeted as being representative of emphysema, and the extraction of the overall signals of the pulmonary parenchyma, makes it possible to carry out an elastic resetting between these two respiratory times and thus to subtract the voxels identified as being of emphysema, from those relative to the overall variation of the pulmonary parenchyma, in order to have a precise and objective measurement of alveolar trapping. This discrimination is not easily possible with a simple overall measurement of the variation of the pulmonary signal. This acquisition mode is thus particularly advantageous for generating a dynamic biomarker that is representative of voxels of interest when they quantify this discrimination.

According to an embodiment, when a first acquisition is made on inspiration and a second acquisition is made on expiration, the acquisitions are configured to trigger at each respiratory cycle at the instants of the cycle. In this embodiment, two acquisitions are carried out in a respiratory cycle.

According to an alternative embodiment, the acquisition is made at each inspiration, and the differential volume is measured between two inspirations. According to another alternative embodiment, the acquisition is made at each expiration, and the differential volume is measured between two expirations. In this case, a single acquisition is made in a respiratory cycle.

According to the second embodiment, the variation in the volume of emphysema over the course of time, either during inspiration, or during expiration, makes it possible to obtain a variation in volume of this emphysema per time unit. This dynamic biomarker is thus a reflection of pulmonary compliance.

According to one or the other of the two embodiments, a thresholding of the voxel intensities may be configured during the acquisition in the course of the inspiration phase and/or during the expiration phase. The method of the invention makes it possible to carry out a measurement of the variations in each configured thresholding. These variations may be measured between two static acquisitions or during a 40 acquisition.

An advantage is to obtain a dynamic marker having a discriminatory capacity during a respiratory dynamic. An interest is to discriminate with better efficiency the volumes of voxels corresponding to different pathologies.

According to one use mode, the dynamic biomarker may be used as a complement to a static biomarker of the invention to confirm or infirm a first characterization of the acquired image and a pathological situation.

Definition of a Third Threshold for Generating the Biomarker

FIGS. 6A and 6B represent signal distribution curves of a segmented volume from an image obtained using a scanner. In this example, a threshold $S_3$ predefined on a given scale makes it possible to discriminate a lung comprising a characteristic volume $V_C$ represented in FIG. 6A more important than the characteristic volume $V_C$ obtained in a case represented in FIG. 6B. The volume $V_C$ may correspond to an intermediate medium corroborating a given physiological sign. The curves obtained in FIGS. 6A and 6B may correspond to those of two patients. FIG. 6A is characteristic of the presence of emphysema. FIG. 6B is characteristic of a healthy subject.

FIGS. 7A and 7B represent distribution curves of signals comprised between the two thresholds $S_1$ and $S_2$ of a characteristic segmented volume $V_C$ obtained by the implementation of the method of the invention. FIG. 7A corresponds, for example, to the same patient as FIG. 6A and FIG. 6B to the same patient as FIG. 7B. FIGS. 7A and 7B are obtained from an MRI imaging system in accordance with the method of the invention.

FIG. 7A represents a characteristic volume $V_C$ obtained for voxels having a value less than a predefined threshold on a scale normalized from 0 to 1. In the case of FIGS. 7A and 7B, the predefined threshold corresponds to a value of 0.2. This threshold makes it possible to obtain good representativeness of emphysema of patients when the hypo-signals are significantly represented below this third threshold $S_3$.

When the threshold $S_3$, comprised between the thresholds $S_2$ and $S_1$, is low, that is to say close to 0, for example between 0 and 0.30, the first biomarker $BIO_{IND1}$ may be used in the detection of signs specific to a emphysema phenomenon.

When the threshold $S_3$, comprised between the thresholds $S_2$ and $S_1$, is a threshold having an intermediate value, that is to say a range of values defined around the median or average value of the scale [0; 1], for example between 0.35 and 0.65, the biomarker $BIO_{IND1}$ may be used as a marker of the trapping of the airways.

This first threshold level thus makes it possible to generate a biomarker $BIO_{IND1}$ making it possible to classify certain patients according to a physiological datum.

An interest of FIG. 7A vis-á-vis FIG. 6A is that the portion of the characteristic volume $V_C$ obtained is more important with the method of the invention than with a method of the prior art. Furthermore, the difference between a healthy subject represented in FIG. 7B and a subject with emphysema is more significant between FIGS. 7A and 7B than between FIGS. 6A and 6B.

The threshold $S_3$ defined at 0.2 on the normalized scale makes it possible to obtain satisfactory results for the practitioner making it possible to discriminate the presence of a characteristic volume of an intermediate medium in the lung.

Second Biomarker

FIG. 3 represents the main steps of the second embodiment of the invention. In this embodiment, a second configuration $CONF_2$ of the MRI imaging system is realized. The second configuration $CONF_2$ makes it possible to configure a $T_2$ type weighting.

The objective of this embodiment is to generate a biomarker representative of a volume of mucus load and/or oedema within the lung volume. An advantage of $T_2$ type weighting is to represent the signal of the image specific to stagnant fluids, such as water, mucus, non-circulating blood. To this end, the method of the invention comprises a step of filtering certain volumes to isolate the volume representative of the mucus load. The second configuration $CONF_2$ of the acquisition $ACQ_2$ may be advantageously completed by a complementary acquisition $ACQ_1$ of an image with $T_1$ weighting or proton density weighting. This complementary acquisition $ACQ_1$ notably makes it possible to improve the segmentation of the lung volume $V_P$, it is preferentially configured as the acquisition of the first embodiment represented in FIG. 2.

Acquisition

According to the second embodiment, the $T_2$ weighting is advantageously realized with a long echo time TE and a repetition time TR considered too long. It will be recalled that this terminology long TE, short TE, long TR, short TR is known to those skilled in the art who will know how to determine an appropriate configuration of the MRI system with $T_2$ weighting. A possible configuration corresponds to an echo time: TE>80 ms and a repetition time: TR>2000 ms.

This acquisition $ACQ_2$ is, for example, made in 2D or 3D. In the first case, a step of reconstruction of a 3D image may be carried out by stack of 2D layers. The three-dimensional image obtained, and optionally processed, then comprises a plurality of voxels. This step is represented in FIG. 3 by the step GEN 3D. This step aims to generate a three-dimensional image from a 2D acquisition.

RTSE Acquisition

According to an embodiment, the acquisition with $T_2$ weighting is a radial acquisition sequence designated "turbo spin echo". It is more commonly noted $T_2$-RTSE.

This $T_2$-RTSE sequence is a 2D spin echo based sequence with a radial trajectory in k-space. During the acquisition of radial data, the center of the k-space is obtained naturally using an averaging effect resulting from the acquisition configuration. This characteristic makes it possible to improve artefacts linked to movements. Immunity to radial movements is reinforced by the use of a so-called PACE (Prospective Acquisition and CorrEction) acquisition technique, This acquisition technique is compatible with various sequences, of which the RTSE sequence. It notably makes it possible of delete some of the kinetic movements, to increase the signal to noise ratio.

$T_2$-RTSE acquisition comprises a sampling density according to rings of increasing radii, the radial projections of the neighboring echo times TEs are then obtained using a linear interpolation. This process is reiterated until the maximum radius is reached, using an algorithm with a pseudo-golden angle ratio, for example described in the publication: "Multi-Echo Pseudo-Golden Angle Stack of Stars Thermometry with High Spatial and Temporal Resolution Using k-Space Weighted Image Contrast".

Several echoes are acquired and are reconstructed using a k-space hierarchization method which preserves the contrasts of the images acquired at each TE. This technique next comprises the generation of a composite image constructed from all the images acquired over a plurality of successive TE, and the reconstruction of the image with $T_2$ weighting from multiple echo acquisitions.

According to an example, the successive echo times TE succeed one other with increasing durations. According to an example, the signal is acquired over 5 TE, for example having respective values of: 20 ms, 50 ms, 85 ms, 100 ms and 150 m s.

The use of long echo times TE going up to 150 ms makes it possible to improve the deletion of signals coming from the blood volumes circulating in the vessels. This function of deletion of signals coming from circulating blood volumes may be improved by an acquisition with spatial saturation and/or a double inversion recovery, and/or a diffusion module. Double inversion recovery is an MRI sequence, noted DIR and known to those skilled in the art, Conversely, non-circulating fluids having TE of short durations to intermediate durations could be erased over long TE. The availability of short TE in the composite image reconstructed over the whole of the TE is thus of nature to make it possible not to lose the information of short TE. Thus, a multi-TE acquisition enables an optimal compromise between the efficient visualization of non-circulating fluids and the erasure of soft parts or circulating vessels.

Advantageously, the second configuration $CONF_2$ of the MRI imaging system comprises a parameterization of the TR and TE times. A suitable parameterization makes it possible to contribute to an acquisition aiming to eliminate circulating volumes, for example blood vessel volumes. Indeed, the parameter TR makes it possible to control the proton inflow phenomenon and the TE makes it possible to control the proton outflow phenomenon. In a spin echo acquisition configuration, the signal acquired drops rapidly when the circulatory speeds increase. Indeed, the circulating protons are not rephased.

The phenomenon is even more marked when long TE times are parameterized, because the quasi-totality of the excited protons have outflowed when the signal is collected. On account of the use of a spin echo sequence, the signal intensity of the vessels is made weak. Notably, the use of long TEs going up to 150 ms, and the spatial saturation upstream of each echo train, make it possible to further eliminate the signal intensity of vessels in circulation.

The second configuration $CONF_2$ advantageously comprises, further, a pre-saturation or a saturation. This technique is based, for example, on the choice of an emitted frequency which may be implemented by the emission of a radiofrequency pulse. This pulse makes it possible to cancel the longitudinal magnetization of the protons. The pulse is advantageously emitted in the form of a pre-pulse before each TE cycle. The radiofrequency pulse disperses the spin phases without being followed by a re-phasing gradient but with a spoiler which eliminates the residual magnetization. For example, a pre-saturation strip placed upstream of a stack of sections makes it possible to blur the magnetization of the protons liable to enter into the section. The signal of these protons will thus be reduced, or even zero, without which they would be liable to have a signal detectable in the absence of pre-saturation. This configuration makes it possible to decrease or to eliminate circulating flows. As a consequence, the method of the invention comprises a step aiming to cancel the signal of protons that move and to conserve the signal of protons that do not move. This operation may thus be carried out thanks to a configuration of the saturation of the signal.

According to an exemplary embodiment, the following parameters may be defined to establish the second configuration $CONF_2$ reconstituted TE =20, 50, 85, 100 and 150 ms, TR=2350 ms, flip angle=145°, size of the pixel=1.6×1.6 mm2, thickness of the section=1.6 mm, no interlacing, average acquisition time=12 minutes.

According to this example, the 3D image may be constructed secondly by stack of 2D images. A volume composed of isotropic voxels, for example of dimension: {1.6 mm}$^3$ may then be obtained.

Complementary Acquisition with $T_1$ or Proton Density Weighting

When a second MRI acquisition is made with $T_1$ weighting or proton weighting in order to segment the lining of the lung volume $V_P$, the configuration with $T_1$ weighting may comprise, for example, an echo time: TE =10 to 20 ms and a repetition time: TR=400 to 600 ms. This second MRI acquisition may be a volume acquisition, that is to say that the image obtained is directly a three-dimensional image. This configuration is then substantially close to the configuration $CONF_1$ of the first embodiment. This final configuration may be realized by defining an ultrashort echo time UTE or instead a Zero TE sequence.

The $T_1$ weighted or proton weighted acquisition of the image is then reset with the image acquired with $T_2$ weighting. The contours of the lung volume $V_P$ extracted from the $T_1$ weighted acquisition may be reset on the image of the $T_2$ weighted acquisition to segment the lung volume $V_P$ of the image of the $T_2$ weighted acquisition.

An advantage of this resetting is to make it possible to recover the contour of the lung volume of which the contrast has been decreased on account of the processing of the circulating blood volume.

According to another example, a sequence with TR=4.1 ms, TE=0.05 ms and an angle of inclination=5 may be defined.

Identically, the image acquired by this second $T_1$ weighted MRI acquisition may be processed by image processing algorithms in order to reduce noise, eliminate artefacts or adapt a contrast scale.

Extraction of the Lung Volume

The three-dimensional images obtained from the first $T_2$ weighted acquisition and from the second $T_1$ weighted acquisition may be superimposed in such a way to filter the voxels of the image inside the lung volume $V_P$. Finally, this $T_1$ weighted acquisition also makes it possible to outline the volume of the heart and to subtract it from the volume of interest.

The objective of the T weighted or proton density weighted acquisition is to realize a mask of the pulmonary lining. To realize this 3D mask, the 3D UTE acquisition is interpolated to correspond to the spatial resolution of the $T_2$-RTSE acquisition. According to an example, the images have been recorded using an optimized multimodal algorithm based on the intensity. An iterative algorithm for selecting the optimal intensity threshold may be implemented. This algorithm calculates the average of the two classes separating the background and foreground images. Further, it calculates in an iterative manner the best separation threshold and stops each time that this calculation does not change. This algorithm may be based on the division of the histogram into two images according to two voxel intensity classes in order to create a pulmonary mask. Next, the pulmonary mask is, for example, applied to the recorded $T_2$-RTSE images in order to isolate the voxels comprised in the lung volume $V_P$. Other techniques make it possible to acquire a mask of the lung volume. For example, the mask may be obtained from another imaging system or from an image acquired previously and recorded in a memory.

First Function $F_1$

The method of the invention comprises a step aiming to generate a first distribution function $F_1$ of a distribution of voxels of the image acquired by the $T_2$ weighted acquisition as a function of the signal intensity. In order to obtain a function $F_1$ which is representative of a mucus load within the lung volume, a step of outlining the lung volume $V_P$ is carried out, for example, from a second $T_1$ weighted acquisition, as mentioned previously. Furthermore, a step of filtering the voxels corresponding to blood fluid circulating in the vessels is also carried out on account of the $T_2$ weighted image acquisition mode as detailed previously.

The first function $F_1$ thus makes it possible to take account of the distribution of a calorimetric parameter, such as the signal intensity, in the image representative of volumes of fluid, such as water. The function $F_1$ thus makes it possible to discriminate volumes of mucus, which are formed substantially of 95% water, or stagnant oedema volumes, which are formed substantially of 90% water, in the lung volume. The signal intensity is preferentially a contrast parameter.

Once the function $F_1$ generated, a curve $C_1$ representative of the distribution of the voxels in the lung volume is obtained. The distribution of the voxels is obtained for an absolute scale of voxels of which the resolution depends on the image acquisition configuration.

Second Function $F_2$

A function $F_2$ making it possible to define an automatic threshold makes it possible to extract a filtered volume $V_F$ and characteristic volume $V_C$. It will be recalled that the filtered volume is the volume extracted from the segmented image corresponding to a zone of interest. The characteristic volume $V_C$ is a volume obtained from the filtered volume in such a way as to generate the biomarker.

To this end, a reference volume $V_A$ is identified in the acquired image. The reference volume $V_A$ is preferentially chosen at the level of an air zone, that is to say a volume corresponding to a volume of air. The reference volume $V_A$ corresponds to a zone of minimum dimension making it possible to be sufficiently representative of a zone corresponding to a volume of air and not to an artefact of the image or a singular zone. In other words, a zone sufficiently large is chosen to obtain a value representative of the air contrast level. This reference volume $V_A$ may be automatically selected at a given position within the pulmonary lining $V_P$ or at a given position outside of the pulmonary lining $V_P$. For example, a position at a predefined distance from the limit of the surface of the thoracic cage makes it possible to obtain a high probability of obtaining an air zone. The distance may for example be comprised between 1 cm and 4 cm, preferentially between 1.5 cm and 3 cm. A distance of 2 cm makes it possible to be compatible with a large number of subjects. The reference volume $V_A$ makes it possible to select a distribution of a colorimetric parameter, that is to say for example a distribution of the signal intensity values, of the reference volume VA, such as the distribution values of a contrast level. The function representing the distribution of the voxels of this reference volume $V_A$ is in this embodiment the second function $F_2$, also noted in this second embodiment $F_A$.

The method of the invention comprises a step aiming to measure the standard deviation $\sigma_A$ of the second function $F_A$. The standard deviation $\sigma_A$ is calculated on the reference volume $V_A$. The method of the invention next comprises the calculation of a reference threshold $S_A$ calculated from the calculated standard deviation $G_A$. According to an embodiment, the reference threshold $S_A$ is a multiple of the standard deviation $G_A$. According to an example, the value of the reference threshold $S_A$ is comprised between 8 and 16 times the value of the standard deviation $\sigma_A$ to which is added the value of the main mode of distribution of the voxels of the pulmonary parenchyma. To this end, a base volume VE of voxels is automatically selected in the zone of the lung. This base volume $V_B$ may be predefined, for example at a minimum distance from the lining of the lung, or be determined around a zone of interest.

The zone of interest may be defined near to or in the neighborhood of the respiratory bronchioles, the alveolar tracts and the alveoli. According to an exemplary case, the whole of the volume of each lung is considered. According to another example, different base volumes $V_B$ are calculated at different places and an average value is next generated. According to another example, the method is repeated for different base volumes $V_B$. The main mode of the base volume $V_B$ is then noted $M_B$.

The main mode represents the value of the greatest distribution of the colorimetric parameter or signal intensity values, it is noted MB. This main mode makes it possible to generate an adaptive threshold which depends on the patient and on his own physiological data. This constitutes a real advantage of the invention in order to measure and quantify the volume of mucus relatively to an individual. In order to obtain a filtered volume discriminating a mucus load volume, the value of the reference threshold $S_A$ is comprised between 10 and 14 times the value of the standard deviation $G_A$ to which is added the main mode $M_B$. According to a preferred example, the value of the reference threshold $S_A$ is defined between 11 and 13 times the value of the standard deviation $G_A$ to which is added the main mode MB. In particular, the value of the reference threshold $S_A = 12\sigma_A + M_B$.

FIG. 9 represents an example of threshold $S_A$ calculated from a main mode obtained from the most representative distribution of the signal of the lung volume $V_P$. On the Y-axis CI figures the signal intensity acquired with $T_2$ and on the X-axis figures a distance metric specific to the represented image in section. The distance "Distance (VP)" is expressed in millimeters and corresponds to the distance from the lining of the lung to another end of the lung.

According to a first example, the distance function (VP) is defined by means of a straight line segment defined from a first point situated on the wall of the lung volume, normal to the wall and a second point defined at the intersection of the pulmonary wall opposite to the first point.

According to another example, the distance function (VP) is defined from a straight line segment defined from a first point situated on the wall of the lung volume and which passes through a center of the lung volume. The center of the lung volume is a fictive center being able to be defined from a geometric function, such as a function determining a barycenter, applied to the lining of the lung volume $V_P$.

According to another example, the distance function (VP) is defined by considering a segment comprised between two points considered on the wall of the lung volume.

The main mode MB may also be calculated within a partial volume of the lung volume $V_P$.

The signal SN corresponds to the signal intensity in a sectional image (2D). It is thus measured from a distance of the lining of the lung. The threshold $S_A$ is obtained using a calculation of the main mode $M_B$, here represented for indicative purposes over the distribution of the intensities of the signal of a section. In order to obtain the threshold SA, to the main mode has been added a multiple of the standard deviation of the signal measured on a reference volume of air taken outside of the lung volume, typically between 12 and 16 times, Segmentation The method comprises a step of segmentation of the volume of voxels greater than the threshold $S_A$. The volume obtained is the filtered volume $V_F$. This filtered volume makes it possible to conserve the high intensity voxels and makes it possible to eliminate a part of the signal corresponding to noise.

According to an embodiment, the function FA, that is to say the second function $F_2$, defines a filter of the function $F_1$. The filter is applied so as to extract the voxels filtered by the function FA, that is to say those for which the voxels have a contrast level greater than the threshold $S_A$. In this case, the function FA defines a mask applied to the function The filtered volume $V_F$ is defined by the volume composed of voxels of the distribution of the function $F_1$ filtered by the reference threshold $S_A$. The voxels of the filtered volume thus have a contrast intensity greater than the reference threshold $S_A$. An interest is to obtain the intensity value with $T_2$ weighting of the zones of mucus present in the lung volume. The function $F_2$ acts as a volume mask filtering the high signal intensities acquired.

FIG. 8 represents an example of a section of the two pulmonary lobes $P_A$, $P_B$ in which are represented zones 10 in 2D corresponding to zone volume parts of intensity greater than the threshold $S_A$. Thus, FIG. 8 represents an example of a volume filtered by the function $F_2$.

The method comprises a step of normalizing the voxel values of the filtered volume $V_F$. According to a first alternative embodiment, the contrast intensity values are normalized over a scale comprised, for example, between 0 and 1.

According to another alternative embodiment, which may be combined or realized as an alternative to the first alternative, the normalization comprises the calculation of a volume intensity product, noted VIP. This VIP is obtained by a product between the volume and the intensity $T_2$ of the signal. It makes it possible to quantify the volume intensity of hypersignals and thus to quantify levels of inflammation. It makes it possible, further, to quantify the evolution of a zone by the correlation between the increase or the decrease in a volume of an inflamed zone and the increase or the decrease in a signal intensity.

The normalization thus comprises a normalization of the absolute values of the colorimetric parameters or the signal intensity of the voxels, here expressed by the quantification of the signal $T_2$, for example expressed in ms and a filtering threshold corresponding to the mask of the applied filtered volume, thanks to the threshold $S_A$.

According to an example, the VIP may be expressed in milliseconds and result from the following equation:

$$VIP = \frac{\sum_{i}^{max} T2ixHSVi}{VP}$$

i corresponds to a value of $T_2$, to this end a distribution of values of the $T_2$ signal is realized;

max corresponds to the maximum value of the $T_2$ signal;

$T2i$ represents the signal of level i of the three-dimensional image;

$HSV_i$ corresponds to the volume associated with the $T_2$ value level of the distribution, said volume being comprised in the mask of the three-dimensional image corresponding to the filtered volume $V_F$ of the high intensities of $T_2$ signals;

$V_P$ corresponds to the lung volume.

An advantage is to obtain a normalized value using an index reflecting an intensity per volume unit. Given the adaptive threshold obtained thanks to the threshold SA, the method of the invention makes it possible to generate a biomarker that is exploitable while limiting the variability of the exploitation and the interpretation of images from one individual to another. Furthermore, this biomarker makes it possible to obtain temporal reference points for measuring the evolution over time of the development of the mucus.

According to an embodiment, a step comprising the merging of the UTE and RTSE images is carried out. A merging of the high resolution morphological images obtained using a sequence with ultra-short echo time UTE, and the mask of the volume of the segmented $T_2$ hypersignals, is in this case carried out in order to combine the two items of information. This technique may be applied by those skilled in the art to PET-TDM.

The invention claimed is:

1. A method for generating a biomarker comprising:
   acquiring an MRI image using an MRI system;
   processing said MRI image to generate a three-dimensional image of the lung;
   generating a first function corresponding to a distribution of different signal intensity values of each voxel of a portion of the acquired three-dimensional image;
   automatically calculating at least one filtering threshold of said first function from at least one second different signal intensity value distribution function of each voxel of a portion of the acquired three-dimensional image;
   segmenting a volume comprising:
      a main volume, corresponding to the lung volume;
      a filtered volume of a volume of voxels quantified by the first function and filtered by at least the calculated filtering threshold,
   normalizing the values of the three-dimensional image of the lung volume from absolute values of the signal intensity values of the voxels of the image and at least the calculated filtering threshold;
   generating a biomarker indicating a normalized segmented volume ratio.

2. The method for generating a biomarker according to claim 1, wherein:
   the acquisition of a three-dimensional image by an MRI system is configured by:
      a $T_2$ weighting;
      an echo time greater than a predefined threshold;
   the automatic calculation of at least one filtering threshold comprises:
      acquiring a reference volume;
      generating a reference function corresponding to a distribution of the different signal intensity values of each voxel of the reference volume, said reference function being the second distribution function;
      calculating the standard deviation of the reference function;
      determining a filtering threshold, designated reference threshold, from the calculated standard deviation of the reference function.

3. The method for generating a biomarker according to claim 2, wherein the acquisition is parameterized and comprises:
   an acquisition of an image recomposed of a plurality of images acquired over a number of cycle of at least 4 echo times, the echo times being configured according to increasing durations;
   a spin echo sequence;
   a parameterization aiming to emit a signal to pre-saturate or to saturate the acquired signal.

4. The method for generating a biomarker according to claim 2, wherein a second acquisition of the image is made with a first configuration to outline the lung volume, the first configuration defining a parameterization of a $T_1$ or proton density weighted acquisition, a step of image processing being carried out to combine the image acquired with $T_2$ weighting with the image acquired by the second acquisition.

5. The method for generating a biomarker according to claim 4, wherein a merger operation between at least one image acquired with $T_1$ weighting with an ultra-short echo time UTE and at least one image acquired with $T_2$ weighting is made to generate an image of which the data coming from each of the acquired images have been combined to segment the lung volume.

6. The method for generating a biomarker according to claim 2, wherein the reference threshold is established from a combination between a reference distribution value of the reference function and a value comprised between 10 and 20 times the value of the standard deviation of the reference function.

7. The method for generating a biomarker according to claim 6, wherein the reference distribution value of the reference function is the main mode of the distribution of the signal intensity values of the image acquired with $T_2$ weighting within the lung volume.

8. The method for generating a biomarker according to claim 2, further comprising a step of normalization, the normalization comprising the calculation of a volume intensity product of the signal from the absolute values of the signal of the filtered volume, the volume resulting from the filtered volume and the lung volume.

9. The method for generating a biomarker according to claim 1, wherein:
   the acquisition of a three-dimensional image using an MRI system, is configured by:
      a proton density or $T_1$ weighting, an echo time
      an echo time less than a predefined threshold;
   the automatic calculation of at least one filtering threshold comprises:
      modeling at least two gaussian functions by adjustment of the first function;
      determining the filtering threshold, called first threshold, by a calculation of the intersection of the first gaussian function and the second gaussian function;
      determining a second threshold corresponding to a minimum value of the first gaussian function and a minimum value of a signal intensity value of a voxel;

the filtered volume is a first volume corresponding to the voxels quantified by the first gaussian function comprised between the first threshold and the second threshold, said voxels corresponding to an air medium, normalizing the values of the three-dimensional image of the lung volume from the first threshold and the second threshold calculated;

generating a first biomarker indicating a ratio of a characteristic volume of the normalized segmented volume, said ratio being calculated between the characteristic volume and the lung volume.

10. The method for generating a biomarker according to claim 9, wherein the echo time is less than 1 ms.

11. The method for generating a biomarker according to claim 9, characterized in that wherein the segmentation comprises the definition of a second volume corresponding to the voxels quantified by the second gaussian function greater than the first threshold, said voxels corresponding to a fatty or intermediate medium.

12. The method for generating a biomarker according to claim 9, wherein the segmentation comprises a step of extracting a characteristic volume comprising voxels of the filtered volume of which the signal intensity value is less than a third predefined threshold, said third predefined threshold being determined on a normalized scale of [0; 1].

13. The method for generating a biomarker according to claim 11, wherein the segmentation comprises a step of exclusion/deletion of voxels disconnected from their neighborhood of voxels of a same quantification.

14. The method for generating a biomarker according to claim 9, wherein the modeling of the gaussian functions comprises:

a gaussian smoothing applied to the acquired image with reduction of the one-off encoding time and with radial acquisition for denoising;

outlining the contours by application of a local filter;

using the curve adjustment method representing the frequency of distribution of voxels.

15. The method for generating a biomarker according to claim 1, further comprising an acquisition of the signal intensity values of each voxel quantified by the first function, the intensity values corresponding to an image contrast datum.

16. The method for generating a biomarker according to claim 1, characterized in that wherein the acquisition is carried out in a synchronized manner with a respirator, the respirator being a navigator or a respiratory belt.

17. The method for generating a biomarker according to claim 1, wherein a step of extracting a volume image is carried out from the images acquired by MRI, said extracted image being realized at a determined instant of the sequence.

18. The method for generating a biomarker according to claim 1, wherein the acquisition of the three-dimensional image is made by a stack of acquired 2D images, a thickness of the section being equal at least to the width of a voxel.

19. The method for generating a biomarker, wherein a first acquisition and a second acquisition according to claim 10 are carried out successively within a respiratory cycle, each acquisition being synchronized with a datum characteristic of an inspiration and respectively an expiration, the method comprising, further:

generating the first biomarker for each acquisition of a same respiratory cycle;

extracting a quantification of a main volume for each acquisition of a same respiratory cycle and elastic resetting between these two respiratory times in order to select voxels representative of a corrected difference between the two biomarkers generated during the first acquisition and the second acquisition.

20. The method for generating a biomarker according to claim 19, further comprising a normalized quantification of said voxels selected between the two acquisitions.

21. The method for generating a biomarker according to claim 9, wherein the acquisition is a 4D acquisition configured to acquire over a predefined duration a variation in the first biomarker per time unit.

22. The method for generating a biomarker according to claim 21, wherein the 4D acquisition is configured to acquire a volume of voxels over a time unit corresponding to a duration of a respiratory cycle, said acquisition being synchronized with a datum characteristic of an inspiration and/or an expiration.

23. A system comprising at least a calculator and a memory and an interface for receiving an image acquired by an MRI system, said system being configured to implement the steps of the method of claim 1.

* * * * *